United States Patent [19]

Marwan et al.

[11] Patent Number: 5,344,210
[45] Date of Patent: Sep. 6, 1994

[54] ENERGY-ABSORBING DEVICE, STRUCTURE FORMING A MOUNTING FOR AN AIRCRAFT SEAT HAVING SUCH A DEVICE, AND SEAT HAVING SUCH A STRUCTURE

[75] Inventors: Dannawi Marwan, Chapelle; Prott Thierry, Nantes, both of France

[73] Assignee: Sicma Aero Seat, Societe Industrielle et Commerciale de Materiel Aeronautique, Paris, France

[21] Appl. No.: 823,327

[22] Filed: Jan. 21, 1992

[30] Foreign Application Priority Data

Jan. 22, 1991 [FR] France ................. 91 00684

[51] Int. Cl.[5] .................... B60N 2/42
[52] U.S. Cl. ..................... 297/216.2
[58] Field of Search .......... 297/216, 216.1, 216.2; 244/122 R, 122 AG

[56] References Cited

U.S. PATENT DOCUMENTS

| | | | |
|---|---|---|---|
| 3,603,638 | 9/1971 | McGregor | 297/216 |
| 4,440,441 | 4/1984 | Marrujo et al. | 297/216 |
| 4,861,103 | 8/1989 | Vallee | 297/216 |
| 5,152,578 | 10/1992 | Kiguchi | 297/216 |

Primary Examiner—James R. Brittain
Attorney, Agent, or Firm—Hill, Steadman & Simpson

[57] ABSTRACT

An energy absorbing device for an aircraft seat supporting structure providing an elongate one piece element pivotably connected to front and rear seat supporting legs and having a general crescent shape with two curved arm portions of opposite convexities separated by a space arranged in a central portion of the crescent shape.

36 Claims, 2 Drawing Sheets

ENERGY-ABSORBING DEVICE, STRUCTURE FORMING A MOUNTING FOR AN AIRCRAFT SEAT HAVING SUCH A DEVICE, AND SEAT HAVING SUCH A STRUCTURE

FIELD OF THE INVENTION

The invention relates to an energy-absorbing device for a structure forming a mounting of an aircraft seat, especially for an aeroplane passenger seat.

PRIOR ART

European Patent EP-A-0,286,471 and U.S. Pat. No. 4,861,103 have already disclosed a structure with an energy-absorbing device resistant to dynamic forces and forming a mounting for an aircraft seat. In this structure, particularly in one embodiment, the energy-absorbing device is of the compression type, for example consisting of two members sliding relative to one another. Moreover, in this structure, the rear foot is in the form of a bracket, the convexity of which is oriented forwards, and the articulations of the structure on the seat and on the floor are such that this bracket-shaped rear foot participates in the energy absorption in the event of a shock, such as that which would be attributable to the crashing of the craft on the ground.

The invention aims to improve the energy-absorbing device, the structure forming a mounting and the seat which are described in European Patent Application 0,286,471 and U.S. Pat. No. 4,861,103, of which the characteristics and terms in their entirety are incorporated by reference, a knowledge of these being implicit. The description therefore expressly relates only to the characteristics, members and components performing a specific function of the invention.

SUMMARY OF THE INVENTION

The object of the invention is to provide an energy-absorbing device which is perfectly adapted to use in a structure forming a mounting for an aircraft seat. In particular, the object of the invention is to provide an energy-absorbing device which makes it possible for the structure forming a mounting and for the seat incorporating it to satisfy the dynamic tests proposed by the FAA and described in the American document NPRM 86-11 (Federal Register volume 51 number 137/17 July 1986, pages 25982 to 25989).

More particularly, the object of the invention is to provide such a device and such a structure, of which the deformation behavior under the effect of the shock must be capable of being determined beforehand with accuracy and reliability. More specifically, the object of the invention is to provide an energy-absorbing device, the characteristics of which can easily be determined as a function of the desired decceleration threshold beyond which deformation and energy absorption are required.

Another object of the invention is to provide an energy-absorbing device and a mounting structure, of which the energy-absorbing characteristics in the event of a shock are essentially a function of the dynamic conditions of this shock and which afford energy absorption with little deformation of the structure and of the attitude of the seat.

Yet another object of the invention is to provide such an energy-absorbing device and such a structure which maintain energy-absorbing characteristics substantially constant in the entire course of their deformation under the effect of the shock.

Finally, the object of the invention is to provide an energy-absorbing device, the effect of which is advantageously combined with that of the bracket-shaped rear foot of convexity oriented forwards.

To achieve this, the invention provides an energy-absorbing device interposed between the front foot and the rear foot of a structure forming a mounting of an aircraft seat, in such a way that, when the structure is deformed in the event of a shock, the device undergoes at least one longitudinal compressive force, characterised in that it consists of a substantially elongate one-piece element, each end of which is associated respectively with one of the feet, in that said element comprises a first portion which shape is predetermined in such a way that this element undergoes a natural general structural plastic deformation according to a mode of deformation prescribed by said predetermined shape of said first portion, and in that said element comprises a second portion arranged so as to oppose the general structural plastic deformation of the element and to undergo a natural plastic bending deformation by buckling from a predetermined value of the longitudinal compressive force applied between said ends of said element. The element is arranged so as to undergo a general plastic bending deformation, particularly by buckling.

According to the invention, said first portion is constituted of a predeformed part of said element, and said second portion is arranged so as to constitute an arched abutment opposing said predeformed part.

According to the invention, the element comprises a localized zone which, before the deformation, is set out from the alignment formed by its two ends and the mechanical characteristics and dimensions of which are such that the general plastic bending deformation of the element is concentrated in this localized zone. Also, the element comprises means for energy absorption by plastic deformation which are active during the general plastic bending deformation of the element in the localized zone generated by the longitudinal compressive force which it undergoes. These energy-absorbing means consist of the localized zone which can be subjected to plastic bending deformation. The localized zone is at least substantially central. Moreover, the element forming the energy-absorbing device according to the invention is dimensioned so as not to undergo any deformation outside the localized zone.

The energy-absorbing means consist at least partly of said first portion which is a less resistant portion of the localized zone of the element, this less resistant portion experiencing plastic bending deformation and thereby absorbing the energy, the plastic bending deformation of this less resistant portion corresponding to the general bending deformation of the element.

The energy-absorbing means consist at least partly of an opposition portion arranged so as to oppose the general bending deformation of the element and the bending deformation of the less resistant portion. This opposition portion consists of a strut opposing the general bending deformation of the element and the bending deformation of the less resistant portion and is dimensioned so as to undergo a buckling deformation by from a predetermined value of the compressive force undergone by the element.

The element forming the energy-absorbing device according to the invention is generally crescent-shaped and is essentially curved or angular, the localized zone being that of greatest overall curvature.

The localized zone consists of two curved-arm portions of opposite convexities separated by a space, curvatures of these portions corresponding to and determining the bending deformations which they undergo during the shock. One of the curved-arm portions forms the apex of greatest curvature of the convex face of the element, and its convexity is therefore oriented in the same direction as that of the element. The other curved-arm portion partly forms the essentially concave face of the element, but its convexity is oriented in the other direction so as to form a strut opposing the general bending deformation of the element.

The invention also relates to a structure forming a mounting for an aircraft seat, which comprises an energy-absorbing device according to the invention.

The invention also relates to a structure forming a mounting for an aircraft seat, especially for an aeroplane passenger seat, associated in an anchored manner with the fixed structure of the craft, especially with the floor, by means of at least one front anchorage of a front foot and by means of at least one rear anchorage of a rear foot, the front and rear feet being associated with the framework of the seat, in the normal position the front foot extending at least substantially vertically from its lower front anchorage, especially perpendicularly to the floor of the craft, the front and rear feet being articulated at their respective upper ends on the framework of the seat, so as to be capable of pivoting about horizontal and transverse pivot axes, the structure comprising an energy-absorbing device associated with the upper part of the rear foot, but at a distance from the upper rear articulation, and associated with the lower front anchorage in its vicinity or thereat, wherein the energy-absorbing device is a device according to the invention.

The structure according to the invention also comprises, in combination, the characteristics which are the subject of European Patent Application 0,286,471. In particular, the rear foot is in the form of a bracket, the convexity of which is oriented forwards, so that, when the structure is deformed, it undegoes a forward bending deformation, the theoretical or prescribed axis of rotation of which is remote from the rear anchorage and substantially vertically in line with the normal initial position of the axis of articulation of the rear foot on the framework of the seat. Means limit or prevent the forward pivoting of the rear foot about its rear anchorage on the fixed structure of the craft. The energy-absorbing device is associated with the upper part of the rear foot above the zone of maximum curvature of the rear foot, in particular by means of an articulation. The energy-absorbing device is associated rigidly with the front anchorage in its vicinity or thereat, without the possibility of pivoting. The convexity of the energy-absorbing device is oriented downwards and rearwards.

The invention also relates to an energy-absorbing device and a structure comprising, in combination, all or some of the characteristics mentioned above and mentioned in European Patent Application 0,286,471.

Finally, the invention relates to an aircraft seat, especially an aeroplane passenger seat, which comprises a mounting formed from a structure according to the invention.

Thus, the invention makes it possible advantageously to improve the structure disclosed by European Patent Application 0,286,471. It may be noted, for example, that the mode of deformation of the energy-absorbing device according to the invention during the absorption of energy does not impede the deformation of the bracket-shaped rear foot and therefore allows the simultaneous absorption of energy both by the bracket-shaped rear foot and by the absorption device itself.

BRIEF DESCRIPTION OF THE DRAWINGS

Other advantages and characteristics of the invention will emerge from a reading of the following description which refers to the accompanying figures, in which.

DESCRIPTION OF THE PREFERRED EMBODIMENTS

Figure 1:
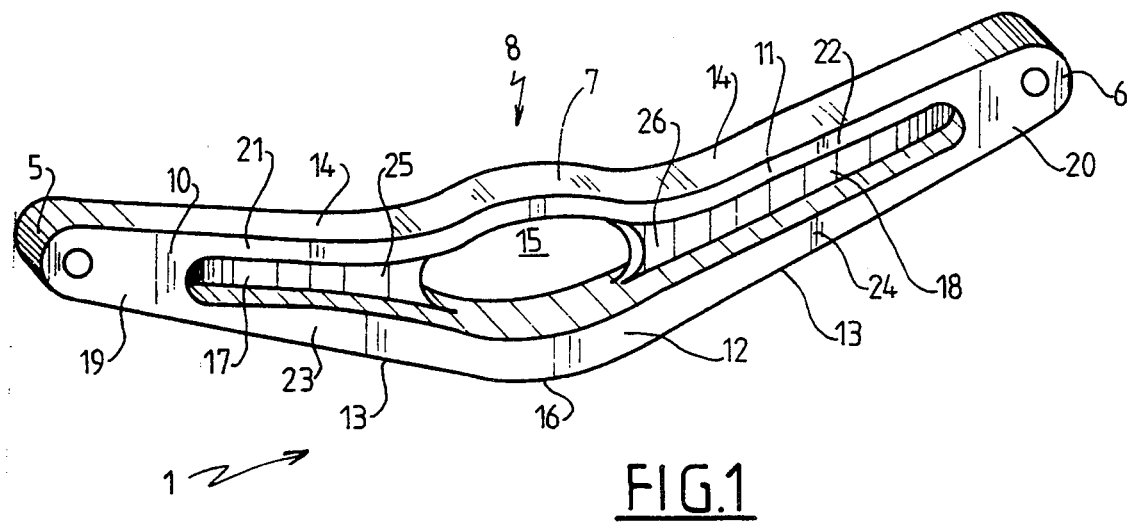
FIG. 1 is a perspective view of an energy-absorbing device according to the invention.

The invention relates to an energy-absorbing device 1 interposed between the front foot 2 and the rear foot 3 of a structure 4 forming a mounting of an aircraft seat, in such a way that, when the structure 4 is deformed in the event of a shock, such as that attributable to the crashing of the craft on the ground, the device 1 undergoes at least one longitudinal compressive force. According to the invention, the energy-absorbing device consists of a substantially elongate one-piece element 1, each end 5, 6 of which is associated respectively with one of the feet 2, 3, in such a way that this element 1 undergoes a natural general structural plastic deformation from a predetermined value of the longitudinal compressive force. According to the invention, the element 1 is arranged so as to undergo a general plastic bending deformation, particularly by buckling. Moreover, the element 1 comprises at least one portion 7 undergoing a natural plastic bending deformation by buckling which is different from or independent of the general plastic deformation of the element 1.

According to the invention, the element 1 comprises a localized zone 8 which, before deformation, is set out from the alignment of the two ends 5, 6. The localized zone 8 is offset laterally at a distance from the straight line 9 represented by dot-and-dash lines in FIG. 2 and passing through the two ends 5, 6 of the element 1. The mechanical characteristics and dimensions of the element 1 in this localized zone 8 are such that the general plastic deformation of the element 1 is concentrated in this localized zone. In particular, the localized zone 8 is less resistant than the rest of the element 1 and is predeformed. Also, the element 1 according to the invention comprises means 7, 12 for energy absorption by structural plastic deformation which are active during the bending deformation of the element 1 in the localized zone 8 generated by the longitudinal compressive force. These energy-absorbing means 7, 12 consist of the element 1 itself and more particularly of the localized zone 8 which can be subjected to plastic bending deformation. The localized zone 8 therefore forms for the element 1 a natural bending pivot axis. The element 1, during its general plastic deformation, is consequently bent about a pivot or bending axis passing through the localized zone 8. According to the invention, the localized zone 8 is at least substantially central in the element 1. Moreover, the element 1 is dimensioned so as not to undergo any deformation outside this localized zone 8.

The element 1 thus consists of two arm portions 10, 11 joining one another in the localized zone 8. The element 1 is generally crescent-shaped and essentially curved or angular, the localized zone 8 being that of greatest overall curvature. The two arm portions 10, 11 joining one another in the localized zone 8 are similar and at least substantially rectilinear or slightly curved, and their longitudinal direction passing through the ends 5, 6 of the element 1 forms an obtuse angle. The arm portions 10, 11 extending from the localized zone 8 towards the ends 5, 6 are more resistant to bending than the component parts of this localized zone 8. Thus, the energy-absorbing means 7, 12 consist at least partly of a less resistant portion 12 of the localized zone 8 of the element 1, this less resistant portion 12 experiencing plastic bending deformation and thereby absorbing the energy, the plastic bending deformation of this less resistant portion 12 corresponding to the general bending deformation of the element 1. Thus, the two arm portions 10, 11 extending from the localized zone 8 bend relative to one another during the general plastic deformation of the element 1 as a result of the plastic bending deformation of the less resistant portion 12 of this localized zone 8. The plastic bending deformation of the element 1 takes place by a reduction of the value of the angle formed by the two arm portions 10, 11 and by the ends 5, 6 approaching one another. The less resistant portion of the localized zone 8 is the extension of the convex face 13 of each of the arm portions 10, 11 of the element 1. Thus, the less resistant portion 12 consists of a curved-arm portion of convexity oriented in the same direction as the general convexity of the element 1 and continuously extending the convex face 13 of the two arm portions 10, 11 which it connects.

The energy-absorbing means 7, 12 moreover consist at least partly of an opposition portion 7 arranged so as to oppose the general bending deformation of the element 1 and the bending deformation of the less resistant portion 12. Thus, the portion 7 undergoing a natural plastic bending deformation by buckling, mentioned above, consists of said opposition portion 7. This opposition portion 7 consists of a strut 7 forming an arched abutment and opposing the general bending deformation of the element 1 and the bending deformation of the less resistant portion 12, and this opposition portion 7 is dimensioned so as to undergo a deformation by buckling, from a predetermined value of the compressive force undergone by the element 1. Thus, the function of this opposition portion 7 is to determine with higher accuracy the trigger threshold of the plastic bending deformation by buckling of the device 1 according to the invention. In fact, when this opposition portion 7 undergoes a deformation by buckling, with the compressive force exceeding the value predetermined for this, the element 1 is deprived of the strut which formed this opposition portion 7 and thus suddenly becomes brittle. From that moment, the less resistant portion 12 immediately undergoes a general bending deformation by buckling of the element 1 in the plastic range.

Thus, the localized zone 8 consists of two curved-arm portions 7, 12 of convexities opposed to one another, separated by a central space 15, the curvatures of these portions 7, 12 corresponding to and determining the bending deformations which they undergo during the shock, that is to say the curvatures of these portions form predeformations making it possible to prescribe the mode of deformation by buckling undergone by these portions. The less resistant portion 12 which shape is predetermined is constituted of a predeformed part of element 1.

The opposition portion 7 is located on the same side as the essentially concave face 14 of the element 1 and the arm portions 10, 11 which join one another in the localized zone 8 and which they connect to one another. Thus, the two arm portions 10, 11 are connected to one another, on the one hand, by the less resistant portion 12 on the essentially convex side of the element 1 and, on the other hand, by the opposition portion 7 on the essentially concave side of the element 1. However, the convexity of the opposition portion 7 is opposite that of the element 1, and it therefore forms an inner bulge on the concave side (FIG. 1). The opposition portion 7 is arranged so as to constitute an arched abutment opposing said predeformed part constituting the less resistant portion 12.

According to the invention, one 12 of the curved-arm portions 7, 12 of the localized zone 8 forms the apex 16 of greatest curvature of the convex face 13 of the element 1, and its convexity is therefore oriented in the same direction as that of the element 1. Also, the other curved-arm portion 7 of the localized zone 8 partly forms the essentially concave face 14 of the element 1, but its convexity is oriented in the other direction so as to form a strut opposing the general bending deformation of the element 1. During the plastic deformation undergone by the element 1 in the event of a shock, the two portions 7, 12 forming the localized deformation zone 8 and the energy-absorbing means experience bending deformation in the plastic range, the opposition portion 7 undergoing a buckling. The bending deformation of the element 1 increases its curvature in the region of the localized zone 8. Subsequently, the curvatures of the two portions 7, 12 forming the localized zone 8 are increased, these portions 7, 12 moreover tending to move away from one another, the width of the space 15 increasing.

Each arm portion 10, 11, extending between one end 5, 6 of the element 1 and the localized zone 8, has a longitudinal recess 17, 18 extending between the concave 13 and convex 14 faces, that is to say along the lateral faces 19, 20 of these arm portions 10, 11. These recesses make it possible to reduce the total weight of the element 1. Furthermore, the resistance of the element 1 is hardly modified by the presence of these recesses 17, 18. Such recesses 17, 18 can be provided on each side, that is to say on each of the lateral faces 19, 20 of each of the arm portions 10, 11. Thus, each arm portion 10, 11 consists of a strip 21, 22 extending longitudinally on the concave side 13 of the element 1, of a strip 23, 24 extending longitudinally on the convex side of the element 1 and of a central rib 25, 26 extending longitudinally between the two strips 21, 23, 22, 24 and between each of the ends 5, 6, connecting the two strips 21, 23, 22, 24 to one another, and the central space 15 of the localized zone 8. The portions 7, 12 of the localized zone 8 consist of an extension of these strips 21, 22, 23, 24 and are at least substantially of the same thickness and the same width as these strips.

The element 1 according to the invention consists of a material capable of undergoing plastic deformation. Preferably, the element 1 consists homogeneously of a single material, only the geometry and dimensions of the localized zone 8 and of the arm portions 10, 11 determining the mode of plastic bending deformation of the element 1. Alternatively, it is possible for the localized zone 8 to consist of a plastics material having characteristics different from, especially less resistant than, those of the arm portions 10, 11 extending between the ends 5, 6 and this localized zone 8.

For example, the element 1 consists of an aluminum alloy which is a plastic of which the plasticity characteristics make it possible easily to produce an energy-absorbing device of low weight and of small bulk.

The invention also relates to a structure 4 forming a mounting for an aircraft seat, which comprises an energy-absorbing device 1 according to the invention. This structure is illustrated diagrammatically in FIG. 2. All its characteristics, other than those described hereinafter, are known from European Patent Application EP-A-0,286,471 or from U.S. Pat. No. 4,861,103, the text of which is considered to be incorporated by reference in the present description. Such a structure is associated with the fixed structure of the craft, especially with the floor, by means of at least one front anchorage 27 of a front foot 2 and by means of at least one rear anchorage 28 of a rear foot 3, the front 2 and rear 3 feet being associated with the framework 29 of the seat, in a normal position the front foot 2 extending at least substantially vertically from its lower front anchorage 27, especially perpendicularly to the floor of the craft, the front 2 and rear 3 feet being articulated at their respective upper ends of the framework 29 of the seat, so as to be capable of pivoting about horizontal and transverse pivot axes, the structure comprising an energy-absorbing device 1 associated with the upper part 30 of the rear foot 3, but at a distance from the upper rear articulation 31, and associated with the lower front anchorage 27 in its vicinity or thereat. The structure comprises means 32 limiting or preventing the forward pivoting of the rear foot 3 about its rear anchorage 28 on the fixed structure of the craft.

The rear foot 3 is in the form of a bracket, the convexity of which is oriented forwards, so that, when the structure 4 is deformed, this rear foot 3 undergoes a forward bending deformation, the theoretical or prescribed bending axis of rotation of which is remote from the rear anchorage 28 and substantially vertically in line with the normal initial position of the axis of articulation of the rear foot 3 on the framework 29 of the seat. The rear foot 3 is formed in such a way that the theoretical or prescribed bending axis of rotation is shifted towards the top of the fixed structure of the craft. According to the invention, the front anchorage 27 comprises an articulation allowing the front foot 2 to pivot forwards from its normal position about a transverse horizontal pivot axis of this front anchorage 27.

The energy-absorbing device 1 is associated with the upper part 30 of the rear foot 3 above the zone 33 of maximum curvature of the rear foot 3. The energy-absorbing device 1 is associated in an articulated manner with the rear foot 3, so as to be capable of pivoting about a transverse horizontal pivot axis. In contrast, the energy-absorbing device 1 is associated rigidly with the front anchorage 27 in its vicinity or thereat, without the possibility of pivoting about a transverse horizontal axis. The two ends 5, 6 associating the energy-absorbing device 1 with the structure 4 define a direction oriented in such a way that the forces projected in this direction and occurring as a result of a longitudinal decceleration of 16 g, with the seat horizontal, and of a vertical decceleration of 14 g, with the seat inclined downwards and forwards at 30°, are substantially the same, especially a direction forming an angle with the horizontal of the order of 37°.

The rear foot 3 is rigid and has such dimensions, especially with regard to thickness, that it remains virtually stationary and non-deformable under normal conditions of use, but experiences plastic deformation, especially bending deformation with the effect of a reduction of its curvature, when the decceleration experienced by the seat and its passenger or passengers exceeds a specific value corresponding to that of an accident situation and subjects the structure 4 to deformation stress, with the result that this deformation of the structure 4 occurs only with a dissipation of elastic and then plastic deformation energy of the rear foot 3. The rear foot 3 is dimensioned in such a way that it begins to experience plastic deformation, especially bending deformation with the effect of a reduction of curvature, from a decceleration experienced by the seat and its passenger which brings about a dissipation of energy in the energy-absorbing device 1, that is to say a compressive force generating a buckling of the opposition portion 7 of the localized zone 8. Also, the front foot 2 and the framework 29, especially the longitudinal members and/or the transverse girders with which the structure 4 is associated, are dimensioned so as to remain rigid or only elastically deformable within the range of the deccelerations which do not bring about a mechanical fracture in the structure 4.

The rear foot 3 and the energy-absorbing device 1 are dimensioned so as to be deformed from a decceleration corresponding to a longitudinal decceleration (along the axis of the force F in FIG. 2) of the order of 15 g, especially between 14 g and 16 g.

Figure 2:
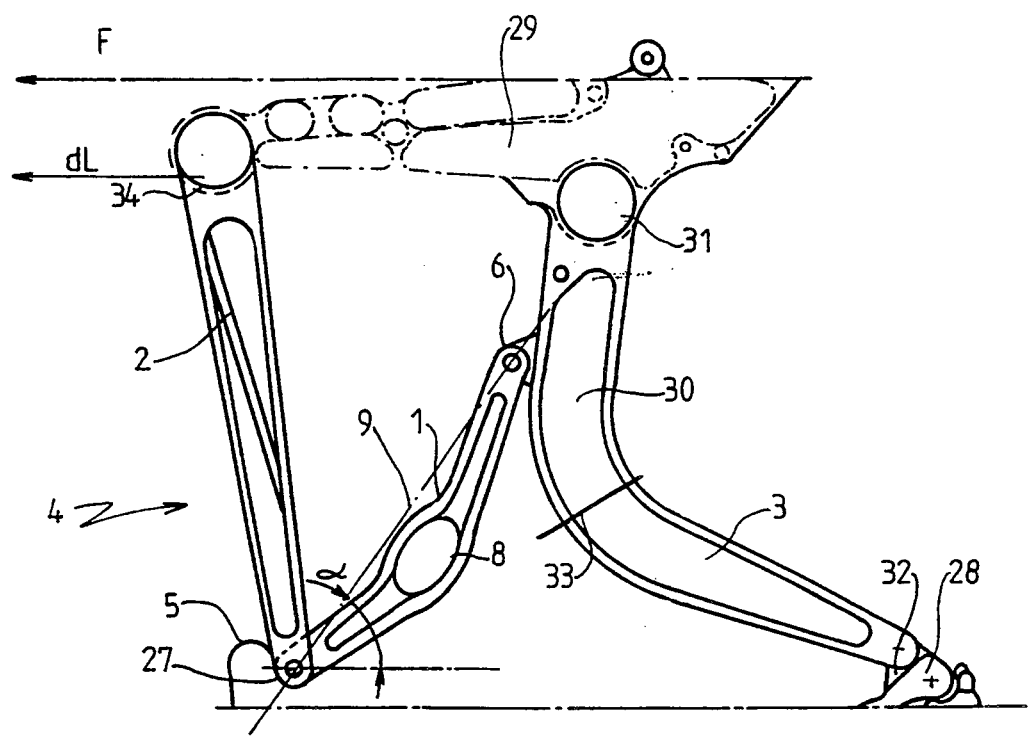
FIG. 2 is a profile view of a structure forming a mounting according to the invention.

As can be seen in FIG. 2, in a structure 4 according to the invention the energy-absorbing device 1 according to the invention is arranged in such a way that its essential convexity is oriented downwards and rearwards, the localized zone 8 being offset downwards and rearwards in relation to the straight line 9 connecting the ends 5, 6. Thus, the essential convexities of the energy-absorbing device 1 and of the rear foot 3 are opposed. During the plastic deformation occurring as the result of a shock, the curvature of the rear foot 3 increases and the curvature of the energy-absorbing device 1 decreases. Thus, the upper end 6 of the energy-absorbing device 1 connected to the rear foot 3 tends to drop as a result of the increase in curvature of this energy-absorbing device 1, the localized zone 8 itself likewise tending to drop, but the upper end of the foot 3 tends to rise because of the opening of the curvature of the foot 3. These two effects contradict one another, and the result is a deformation which takes place with the attitude of the upper part 30 of the rear foot 3, hence of the seat, being substantially preserved.

Figure 3:
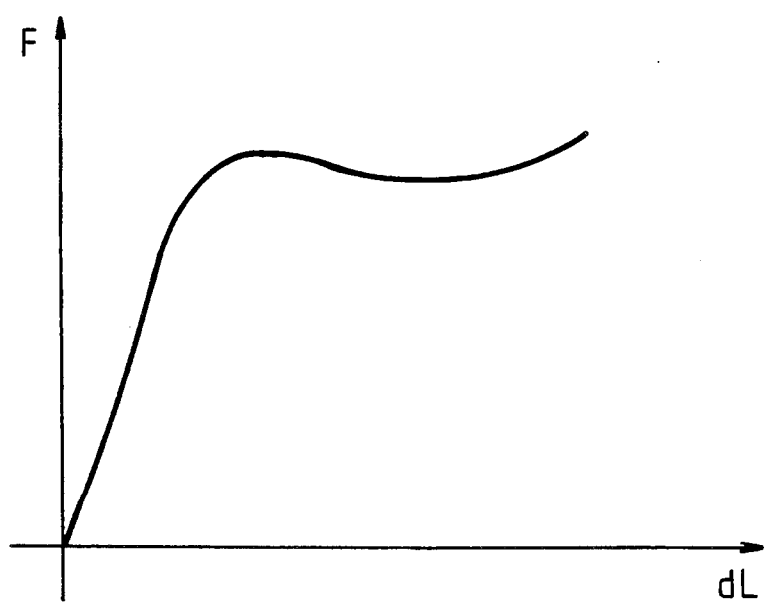
FIG. 3 is a diagram illustrating the curve representing the value of the absorbed force as a function of the deformation of the structure according to the invention with an energy-absorbing device according to the invention.

Furthermore, the curve shown in FIG. 3 illustrates the variations of the absorbed horizontal force F during the deformation of the structure 4 as a function of the displacement dL of the upper end 34 of the front foot 2 in the horizontal direction (in the directions and ways shown in FIG. 2). As can be seen, the absorbed force remains substantially constant over a wide range of variation in the displacement dL. From that moment, as soon as the plastic deformation range is reached, a large amount of energy is dissipated, since the absorbed force does not decrease as a function of the displacement, contrary to what generally occurs in most energy-absorbing devices and in structures subjected to buckling.

Finally, the invention relates to an aircraft seat, especially an aeroplane passenger seat, which comprises a mounting formed from a structure 4 according to the invention.

We claim:

1. An energy-absorbing device interposed between the front foot and the rear foot of a structure forming a mounting of an aircraft seat, in such a way that, when the structure is deformed in the event of a shock, the device undergoes at least one longitudinal compressive force, comprising a substantially elongate one-piece element, each end of which is associated respectively with one of the feet,3 in that said element comprises a first portion which shape is predetermined in such a way that this element undergoes a natural general structural plastic deformation according to a mode of deformation prescribed by said predetermined shape of said first portion, and in that said element comprises a second portion arranged so as to oppose the general structural plastic deformation of the element and to undergo a natural plastic bending deformation by buckling from a predetermined value of the longitudinal compressive force applied between said ends of said element.

2. The device as claimed in claim 1, wherein the element is arranged so as to undergo a general plastic bending deformation.

3. The device as claimed in claim 2, wherein the element is arranged so as to undergo a general plastic bending deformation by buckling.

4. The device as claimed in claim 1, wherein said first portion is constituted of a predeformation part of said element, and wherein said second portion is arranged so as to constitute an arched abutment opposing said predeformed part.

5. The device as claimed in claim 1, wherein the element comprises a localized zone which, before deformation, is set out from the alignment of its two ends, wherein the mechanical characteristics and dimensions of this localized zone are such that the general plastic deformation of the element is concentrated in this localized zone, and wherein there are means for energy absorption by plastic deformation which are active during the bending deformation of the element in the localized zone generated by the longitudinal compressive force.

6. The device as claimed in claim 5, wherein the energy-absorbing means comprises plastic bending deformation of the localized zone.

7. The device as claimed in claim 5, wherein the localized zone is at least substantially central.

8. The device as claimed in claim 5, wherein the element is dimensioned so as not to undergo any deformation outside the localized zone.

9. The device as claimed in claim 5, wherein the energy-absorbing means consist at least partly of said first portion which is a less resistant finest portion of the localized zone of the element, this less resistant portion experiencing plastic bending deformation and thereby absorbing the energy, the plastic bending deformation of this less resistant portion corresponding to the general being deformation of the element.

10. The device as claimed in claim 9 , wherein the second portion is arranged so as to oppose the general bending deformation of the element and the bending deformation of the less resistant first portion.

11. The device as claimed in claim 10, wherein the second portion consists of a strut opposing the general bending deformation of the element and the bending deformation of the less resistant first portion, and wherein this second portion is dimensioned so as to undergo a deformation by buckling from a predetermined value of the compressive force undergone by the element.

12. The device as claimed in claim 5, wherein the localized zone consists of two curved-arm portions of opposite convexities separated by a space, the curvatures of these portions corresponding to and determining the bending deformations which they undergo during the shock.

13. The device as claimed in claim 12, wherein the device comprises a convex face and an essentially concave face and wherein one of the curved-arm portions of the localized zone forms an apex of greatest curvature of the convex face of the device, and its convexity is therefore oriented in the same direction as that of the device, and wherein the other curved-arm portion partly forms the essentially concave face of the device, but its convexity is oriented in the other direction so as to form a strut opposing the general bending deformation of the device.

14. The device as claimed in claim 1, wherein the element is generally crescent-shaped.

15. The device as claimed in claim 1 , wherein the element is essentially curved or angular, the localized zone being that of greatest overall curvature.

16. A structure forming a mounting for an aircraft seat, comprising;

an energy-absorbing device;

a front foot; and a rear foot, said energy absorbing device interposed between the front foot and the rear foot; and wherein the device undergoes at least one longitudinal compressive force, when the structure is deformed in the event of a shock, wherein the device comprises a substantially elongate one-piece element, each end of which is associated respectively with one of the feet, in that said element comprises a first portion which shape is predetermined in such a way that this element undergoes a natural general structure plastic deformation according to a mode of deformation prescribed by said predetermined shape of said first portion, and in that said element comprises a second portion arranged so as to oppose the general structural plastic deformation of the element and to undergo a natural plastic bending deformation by buckling from a predetermined value of the longitudinal compressive force applied between said ends of said element.

17. A structure forming a mounting for an aircraft seat, associated in an anchored manner with the fixed structure of the craft, by means of at least one front anchorage of a front foot and by means of at least one rear anchorage of a rear foot, the front and rear feet being associated with a framework of the seat, in a normal position the front foot extending at least substantially vertically from the lower front anchorage thereof, especially perpendicularly to the floor of the craft, the front and rear feet being articulated at the respective upper ends thereof on the framework of the seat, so as to be capable of pivoting about horizontal and transverse pivot axes, the structure comprising an energy-absorbing device associated with an upper part of the rear foot, but at a distance from an upper rear articulation, and associated with the lower front anchorage and in the vicinity or at the lower front anchorage, wherein the energy-absorbing device undergoes at least one longitudinal compressive force, when the structure is deformed in the event of a shock, wherein the device comprises a substantially elongate one-piece element, in that said element comprises a first portion which shape is predetermined in such a way that this element undergoes a natural general structure plastic deformation according to a mode of deformation prescribed by said predetermined shape of said first portion, and in that said element comprises a second portion arranged so as to oppose the general structural plastic deformation of the element and to undergo a natural plastic bending deformation by buckling from a predetermined value of the longitudinal compressive force applied between said ends of said element.

18. The structure as claimed in claim 17, which, in combination, comprises means limiting or preventing the forward pivoting of the rear foot about its rear anchorage on the fixed structure of the craft.

19. The structure as claimed in claim 17, wherein, in combination, the rear foot is in the form of a bracket, the convexity of which is oriented forwards, so that, when the structure is deformed, the rear foot undergoes a forward bending deformation, the theoretical or prescribed bending axis of rotation of which is remote from the rear anchorage and substantially vertically in line with the normal initial position of the axis of articulation of the rear foot on the framework of the seat.

20. The structure as claimed in claim 19, wherein the rear foot is formed in such a way that the theoretical or prescribed bending axis of rotation is shifted towards the top of the fixed structure of the craft.

21. The structure as claimed in claim 19, wherein the energy-absorbing device is connected to the upper part of the rear foot above a zone of maximum curvature of the rear foot.

22. The structure as claimed in claim 17, wherein the front anchorage comprises an articulation allowing the front foot to pivot forwards from its normal position about a transverse horizontal pivot axis of this front anchorage.

23. The structure as claimed in claim 17, wherein the energy-absorbing device is connected in an articulated manner with the rear foot, so as to be capable of pivoting about a transverse horizontal pivot axis.

24. The structure as claimed in claim 17, wherein the energy-absorbing device is connected rigidly with the front anchorage in its vicinity or thereat, without the possibility of pivoting about a transverse horizontal axis.

25. The structure as claimed in claim 17, wherein the two ends associating the energy-absorbing device with the structure define a direction oriented in such a way that the forces projected in this direction and occurring as a result of a longitudinal deceleration of 16 g, with the seat horizontal, and of a vertical deceleration of 14 g, with the seat inclined downwards and forwards at 30°, are substantially the same, especially a direction forming an angle with the horizontal of the order of 37°.

26. The structure as claimed in claim 17, wherein the rear foot is rigid and has such dimensions, especially with regard to thickness, that it remains virtually stationary and non-deformable under normal conditions of use, but experiences plastic deformation, especially bending deformation with the effect of a reduction of its curvature, when the deceleration experienced by the seat and its passenger or passengers exceeds a specific value corresponding to that of an accident situation and subjects the structure to deformation stress, with the result that this deformation of the structure occurs only with a dissipation of elastic and then plastic deformation energy of the rear foot.

27. The structure as claimed in claim 26, wherein the rear foot is dimensioned in such a way that it begins to experience plastic deformation, especially bending deformation with the effect of a reduction of curvature, from a deceleration experienced by the seat and its passenger which brings about a dissipation of energy in the energy-absorbing device, and wherein the front foot and the framework, especially a longitudinal member and/or a transverse girder with which the structure is associated, are dimensioned so as to remain rigid or only elastically deformable within the range of the decelerations which do not bring about a mechanical fracture in the structure.

28. The structure as claimed in claim 27, wherein the rear foot and the energy-absorbing device are dimensioned so as to be deformed from a deceleration corresponding to a longitudinal deceleration of the order of 14 g to 16 g.

29. The structure as claimed in claim 17, wherein the energy-absorbing device is oriented with a downwards and rearwards convexity.

30. An aircraft seat which comprises a mounting formed from a structure, the structure associated in an anchored manner with the fixed structure of the craft by means of at least one front anchorage of a front foot and by means of at least one rear anchorage of a rear foot, the front and rear feet being associated with a framework of the seat, in a normal position the front foot extending at least substantially vertically from the lower front anchorage thereof, especially perpendicularly to the floor of the craft, the front and rear feet being articulated at the respective upper ends thereof on the framework of the seat, so as to be capable of pivoting about horizontal and transverse pivot axes, the structure comprising an energy-absorbing device connected to an upper part of the rear foot, but at a distance from an upper rear articulation, and connected to the lower front anchorage in the vicinity or at the lower front anchorage, wherein the energy-absorbing device undergoes at least one longitudinal compressive force, when the structure is deformed in the event of a shock, wherein the device comprises a substantially elongate one-piece element, in that said element comprises a first portion which shape is predetermined in such a way that this element undergoes a natural general structure plastic deformation according to a mode of deformation prescribed by said predetermined shape of said first portion, and in that said element comprises a second portion arranged so as to oppose the general structural plastic deformation of the element and to undergo a natural plastic bending deformation by buckling from a predetermined value of the longitudinal compressive force applied between said ends of said element.

31. An energy absorbing device for installation between front and rear legs of an aircraft seat, comprising:
an elongate strut having a general curvature between opposite ends forming a concave side and a convex side, and having an aperture formed through a central region thereof.

32. The energy-absorbing device according to claim 31, wherein said rear leg of said aircraft seat is curved, with a convex side directed toward a front of said seat, and said strut is arranged with said concave side toward a front side of said seat, said strut pivotally mounted to said rear leg.

33. The energy-absorbing device according to claim 31, wherein said central region is locally bowed outward convexly on said concave side.

34. The energy-absorbing device according to claim 33, wherein said central region is locally bowed outward convexly on said convex side.

35. The energy-absorbing device according to claim 34, wherein said strut comprises a recess formed along the length of said strut between said opposite ends and formed into a front side of said strut, said front side arranged generally planarly perpendicular to said concave side.

36. The energy-absorbing device according to claim 35, wherein said strut comprises a recessed area arranged along a length of said strut between said opposite ends, said recess formed into a back side of said strut, said back side generally planarly perpendicular to said concave side.

* * * * *